July 6, 1943.  C. G. ZETTERSTRÖM ET AL  2,323,747
JUICE EXTRACTOR
Filed April 16, 1941
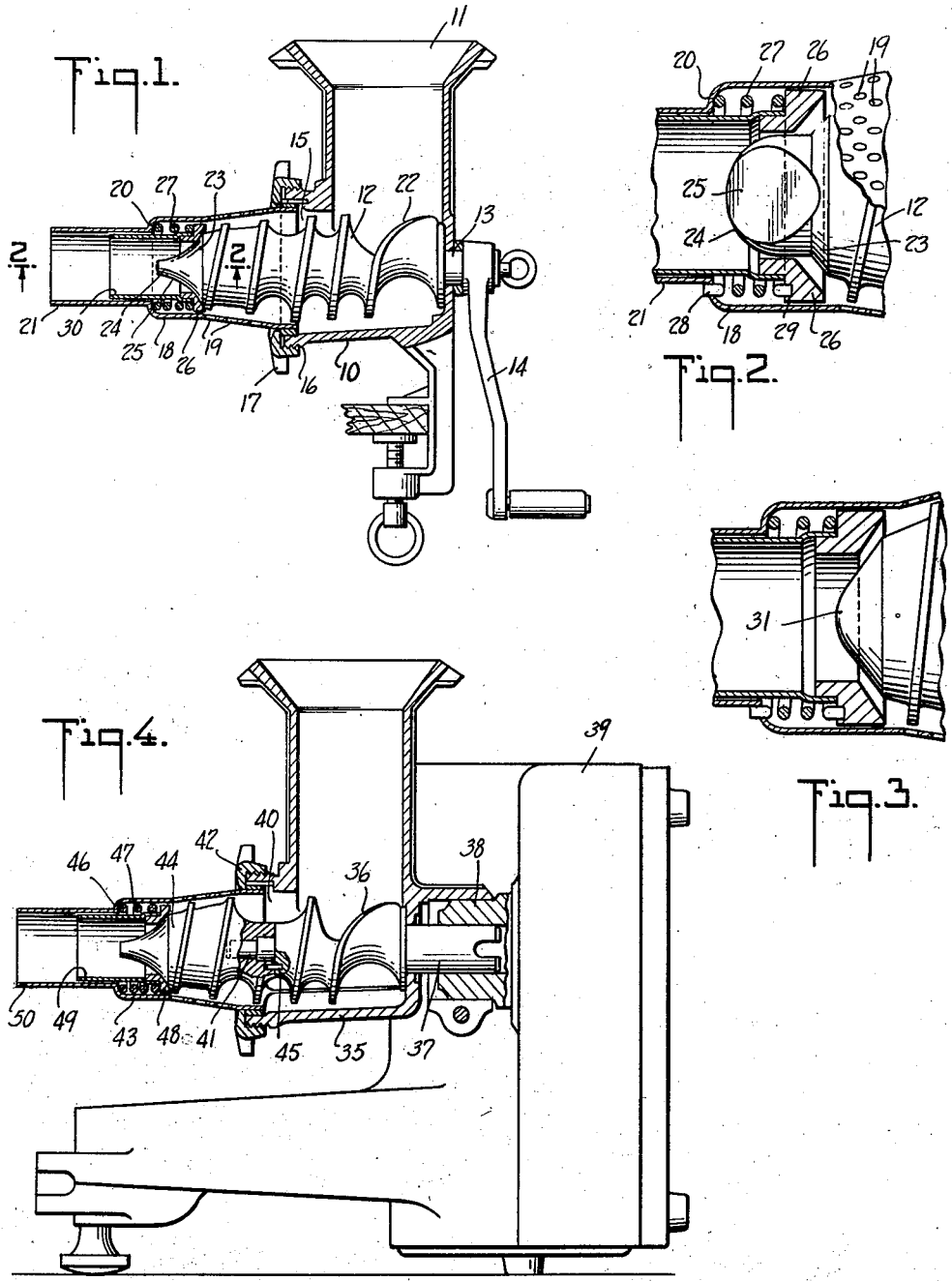

Patented July 6, 1943

2,323,747

UNITED STATES PATENT OFFICE 2,323,747

JUICE EXTRACTOR

Carl Gunnar Zetterstrom and Lars Johan Faith Ell, Stockholm, Sweden, assignors to Aktiebolaget Elektrolux, Stockholm, Sweden, a corporation of Sweden Application April 16, 1941, Serial No. 388,760
In Sweden April 24, 1940

10 Claims. (Cl. 100—48)

Our invention relates to an improved juice extracting apparatus.

In accordance with our invention a conveyor worm with a pitch decreasing in depth is rotatably disposed within a housing, which is provided with perforations. As the fruit is advanced by the conveyor screw, it is compressed by reason of the decreasing depth of the pitch and the juice is squeezed out of the solid matter and passes through the perforations. The solid matter is discharged through an opening provided at the end of the housing and, in accordance with our invention, improved valve means are provided for restricting the passage of the solids through this opening. This valve means includes an annular valve member which is reciprocably mounted within the housing and cooperates with a valve seat formed on the end of the rotating worm. Displacement of the valve member from the seat is resisted by means of a spring and assures that the solid material is sufficiently compressed so that substantially all of the juice is extracted therefrom. Due to the fact that the seat is formed on the rotating conveyor, it prevents the clogging of the valve by the solids.

Another object of our invention is to provide an arrangement whereby an ordinary meat grinder may be converted into a juice extractor.

Further objects and advantages will be apparent from the following description considered in connection with the accompanying drawing which forms a part of this specification and of which;

Fig. 1 is a cross-sectional view of one embodiment of our invention;

Fig. 2 is a cross-sectional view on an enlarged scale taken on the line 2—2 of Fig. 1;

Fig. 3 is a view similar to Fig. 2, but showing a modification; and

Fig. 4 is a cross-sectional view showing a second embodiment of our invention.

Referring more particularly to Figs. 1 and 2, reference character 10 designates a housing, the upper part of which is formed as an inlet 11 for receiving the fruit. Rotatably mounted within the lower part of the housing 10 is a conveyor worm 12. One end of this worm is formed with a shaft 13 which is rotatably journalled in the end wall of housing 10 and carries on the exterior of the wall a crank arm 14.

The housing 10 is formed with a circular opening 15, the outer wall of which is provided with screw threads 16 which are engaged by a wing nut 17 to secure a housing 18 to the housing 10. The housing 18 has a conical portion which is provided with perforations 19. To the left of the conical portion, as viewed in Fig. 1, the housing 18 is formed as a shoulder 20, beyond which is a cylindrical outlet portion 21.

As clearly shown in Fig. 1, the conveyor screw 12 is formed with a thread 22 which has a deep pitch at the right-hand end thereof and which becomes more shallow towards the left-hand end. Near its left-hand end, the conveyor screw is formed with a circular seat 23. To the left of the seat, the screw is formed with a wedged shaped projection 24, the sides of which are concave, as is shown at 25.

An annular valve member 26 is adapted to engage the seat 23 and to be held thereagainst by means of a coil spring 27 disposed between the valve member and the shoulder 20. One end 28 of the spring is received within a recess formed in the casing 18, while the opposite end 29 engages a recess formed in the valve member 26 to thus prevent rotation of the valve member. Secured to the valve member is a cylindrical sleeve 30 which is slidably received in the outlet portion 21 of the casing.

The above described device operates as follows:

Fruit is introduced through the opening 11 and, upon rotation of the conveyor 12 by means of the handle 14, the fruit is forced into the housing 18. Due to the decrease in the pitch of a conveyor, the fruit is crushed and squeezed so as to extract the juice from the solid matter. The juice passes through the perforations and is collected in a suitable receptacle placed thereunder. The solid material is advanced to the left through the housing 18 until it strikes the valve member 26, which it displaces against the force of the spring 27. However, the valve member under the influence of this spring imparts a sufficient resistance to the passage of the solid material to assure that substantially all of the juice is squeezed therefrom. The rotation of the conveyor and the wedged shaped projection 24 thereon, assures that the space between the seat 23 and the valve member, when the latter is displaced to the position shown for instance in Fig. 2, will not become clogged by the solid matter.

The sleeve 30 acts as a guide for the valve member and assures that the latter remains in a plane substantially perpendicular to the axis of the conveyor.

The embodiment illustrated in Fig. 3 differs from that above described only in the shape of the left-hand portion of the conveyor screw. As here shown, this portion 31 is conical, rather than wedged shaped.

In Fig. 4 there is illustrated the manner in which a meat grinder may be converted into a juice extractor. As here shown, the reference character 35 designates the housing of a meat grinder within which is rotatably mounted a grinding worm 36. The worm is provided with a pin 37 journalled in the end wall of the housing and connected to the shaft 38 of an electric motor which is mounted within a casing 39. The left-hand end of the worm 36 terminates adjacent to the opening 40 formed in the housing and is provided with an axially disposed pin 41 which, when the device is used as a meat grinder, serves to carry the usual cutting knives which are disposed on the outside of a perforated plate held in place by means of the wing nut 42. When used as a juice extractor, this plate is removed and the nut 42 serves to secure a perforated housing 43 to the housing 35. Within the housing 43 there is disposed a worm 44, the right-hand end of which, as viewed in Fig. 4, is provided with a centrally located recess within which is received the pin 41. An eccentrically located pin 45 engages recesses in the two worms so as to transmit torque from the worm 36 to the worm 44.

The housing 43 is formed with a shoulder 46 and a spring 47 is disposed between this shoulder and an annular valve member 48 which cooperates with a seat formed on the left-hand end of the worm 44. The valve member is carried by a cylindrical sleeve 49, which is slidably received within the cylindrical portion 50 of the housing 43.

Preferably, the pitch of the right-hand end of the worm 44 is the same as the pitch of the left-hand end of the worm 36. That is, to say, the worms have the same pitch at the place where they are joined together. This reduces the tendency of the solid matter to axially separate the two worms. On the left-hand portion of the worm 44, the pitch is more shallow, as is the case of the worm shown in Fig. 1.

The operation of this embodiment when used as a fruit extractor is substantially the same as that above described. However, the apparatus may be readily converted to a meat grinder by removing the wing nut 42, whereupon the housing 43 may be detached from the housing 35 and the worm 44 removed from the worm 36.

While we have illustrated and described several embodiments of our invention, it is to be understood that this has been done for purposes of illustration only and that our invention is not to be limited thereto, but its scope is to be determined by the appended claims.

What is claimed:

1. In a fruit juice extracting machine, a housing, a rotatable member including a spiral worm disposed within said housing for compressing fruit to separate the juice from the solids, said housing being formed with a plurality of small apertures for the withdrawal therethrough of the juice and with a discharge port for the solids axially spaced from one end of said rotatable member, an annular valve seat formed on said end of said rotatable member, an axially displaceable annular valve member cooperating with said seat, and resilient means urging said valve member against said seat, said housing constituting an abutment for said resilient means.

2. In a fruit juice extracting machine, a housing, a rotatable member including a spiral worm disposed within said housing for compressing fruit to separate the juice from the solids, said housing being formed with a plurality of small apertures for the withdrawal therethrough of the juice and with a discharge port for the solids axially spaced from one end of said rotatable member, an annular valve seat formed on said end of said rotatable member, an axially displaceable annular valve member cooperating with said seat, resilient means for urging said valve member against said seat, and stop means for limiting the displacement of said valve member away from said seat, said housing constituting an abutment for said resilient means.

3. In a fruit juice extracting machine, a housing, a rotatable member including a spiral worm disposed within said housing for compressing fruit to separate the juice from the solids, said housing being formed with a plurality of small apertures for the withdrawal therethrough of the juice and with a discharge port for the solids axially spaced from one end of said rotatable member, an annular valve seat formed on said end of said rotatable member, an axially displaceable annular valve member cooperating with said seat, and a coil spring disposed between said housing and said valve member for urging the latter towards said seat, said spring when fully compressed serving as an abutment for limiting displacement of said valve member away from said seat.

4. In a fruit juice extracting machine, a housing, a rotatable member including a spiral worm disposed within said housing for compressing fruit to separate the juice from the solids, said housing being formed with a plurality of small apertures for the widthdrawal therethrough of the juice and with a discharge port for the solids axially spaced from one end of said rotatable member, an annular valve seat formed on said end of said rotatable member, an axially displaceable annular valve member cooperating with said seat, said housing being formed with an internal shoulder, and a coil spring disposed between said shoulder and said valve member for urging the latter against said seat.

5. In a fruit juice extracting machine, a substantially cylindrical housing having a shoulder disposed between portions of different diameter, a rotatable member including a spiral worm within the portion of larger diameter for compressing fruit to separate the juice from the solids, said housing being formed with a plurality of small apertures for the withdrawal therethrough of the juice, the portion of smaller diameter forming a discharge port for the solids in axial alignment with said rotatable member, a valve seat formed on the end of said rotatable member which is adjacent to said shoulder, an axially displaceable annular valve member cooperating with said seat, a coil spring disposed between said shoulder and said valve member for urging the latter against said seat, and a cylindrical sleeve secured to said annular valve member and slidable in said portion of smaller diameter.

6. In a fruit juice extracting machine, a substantially cylindrical housing having a shoulder disposed between portions of different diameter, a rotatable member including a spiral worm within the portion of larger diameter for compressing fruit to separate the juice from the solids, said housing being formed with a plurality of small apertures for the withdrawal therethrough of the juice, the portion of smaller diameter forming a discharge port for the solids in axial alignment with said rotatable member, a valve seat formed on the end of said rotatable member adjacent to said discharge port, a bearing carried by said housing for supporting the opposite end of said rotatable member, an axially displaceable annular valve member cooperating with said seat, resilient means disposed between said shoulder and said valve member for urging the latter against said seat, and a cylindrical sleeve secured to said annular valve member and slidably received in said portion of smaller diameter for supporting said valve member.

7. In a fruit juice extracting machine, a housing, a rotatable member including a spiral worm disposed within said housing for compressing fruit to separate the juice from the solids, said housing being formed with a plurality of small apertures for the withdrawal therethrough of the juice and with a discharge port for the solids axially spaced from one end of said rotatable member, an annular valve seat formed on said end of said rotatable member, an axially displaceable annular valve member cooperating with said seat, and resilient means urging said valve member against said seat, the end of said rotatable member which is bounded by said annular valve seat being substantially conical, said housing constituting an abutment for said resilient means.

8. In a fruit juice extracting machine, a housing, a rotatable member including a spiral worm disposed within said housing for compressing fruit to separate the juice from the solids, said housing being formed with a plurality of small apertures for the withdrawal therethrough of the juice and with a discharge port for the solids axially spaced from one end of said rotatable member, an annular valve seat formed on said end of said rotatable member, an axially displaceable annular valve member cooperating with said seat, and resilient means urging said valve member against said seat, the end of said rotatable member which is bounded by said annular valve seat being wedge shaped with substantially cylindrical side surfaces, said housing constituting an abutment for said resilient means.

9. In a machine which is convertible from a meat grinder to a fruit juice extractor, a housing portion having a hopper and an outlet opening, a meat grinding worm rotatably disposed in said housing portion in alignment with said outlet opening, a substantially cylindrical housing portion, means for removably securing said cylindrical portion to the first mentioned portion in alignment with said outlet opening, a juice extracting worm disposed within said cylindrical portion, an axially extending projection on one end of one of said worms receivable within a recess in the adjacent end of the other worm for transmitting torque from the meat grinding worm to the juice extracting worm, the opposite end of said juice extracting worm being formed with a thrust transmitting surface, an axially displaceable annular member cooperating with, and resilient means disposed between said substantially cylindrical housing portion and said annular member for urging the latter towards said surface to thereby retain said projection within said recess.

10. In a fruit juice extracting machine, a housing, a rotatable member including a spiral worm disposed within said housing for compressing fruit to separate the juice from the solids, said housing being formed with a plurality of small apertures for the withdrawal therethrough of the juice and with a discharge port for the solids axially spaced from one end of said rotatable member, an annular valve seat formed on said end of said rotatable member, an axially displaceable annular valve member cooperating with said seat, and resilient means urging said valve member against said seat, said housing having a recess in which said resilient means is seated.

CARL GUNNAR ZETTERSTROM.
LARS JOHAN FAITH ELL.